April 20, 1965   J. R. WATSON   3,178,886
METHOD AND APPARATUS FOR CONTROL OF FLUID SYSTEMS
Filed Nov. 22, 1961   4 Sheets-Sheet 4

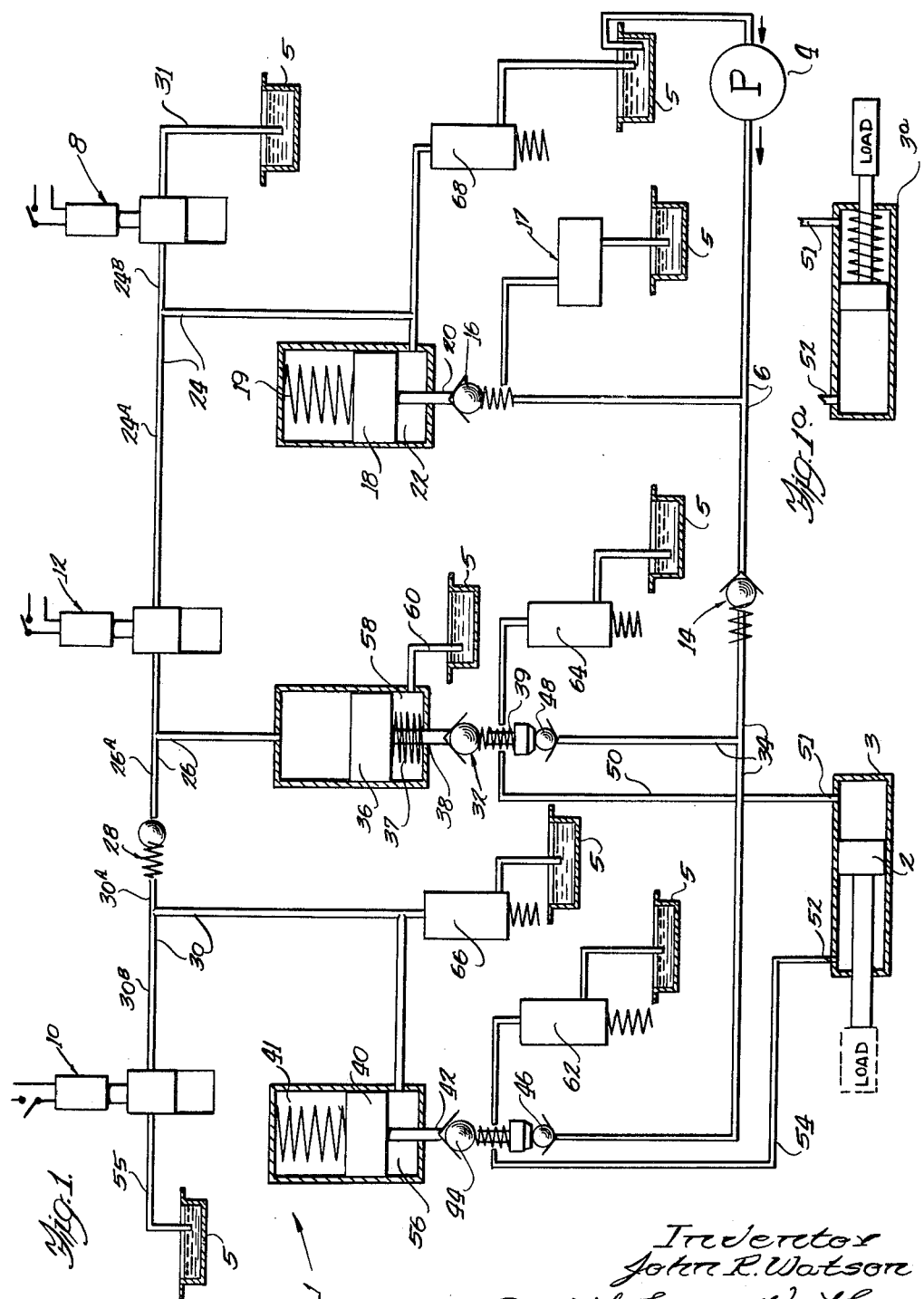

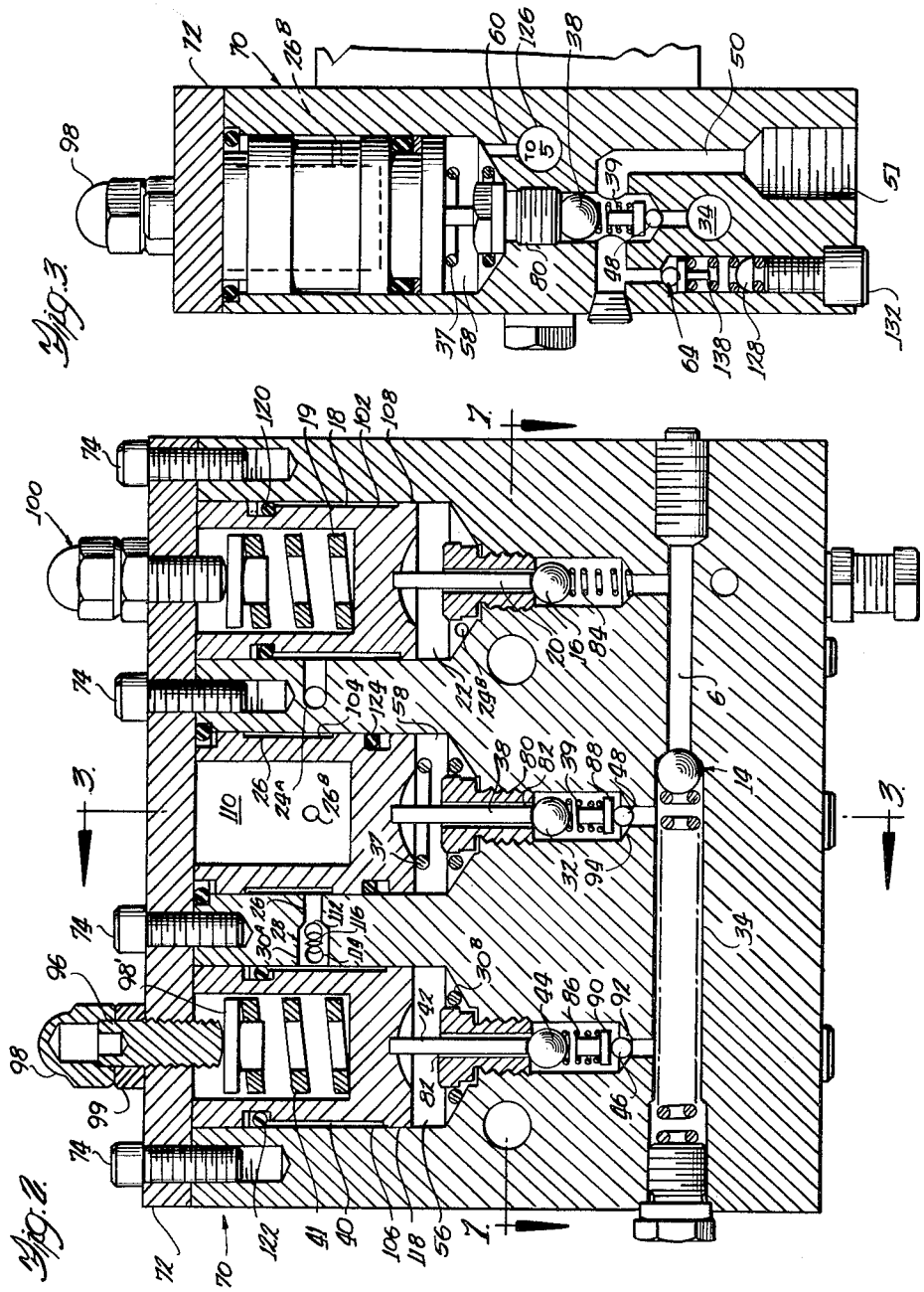

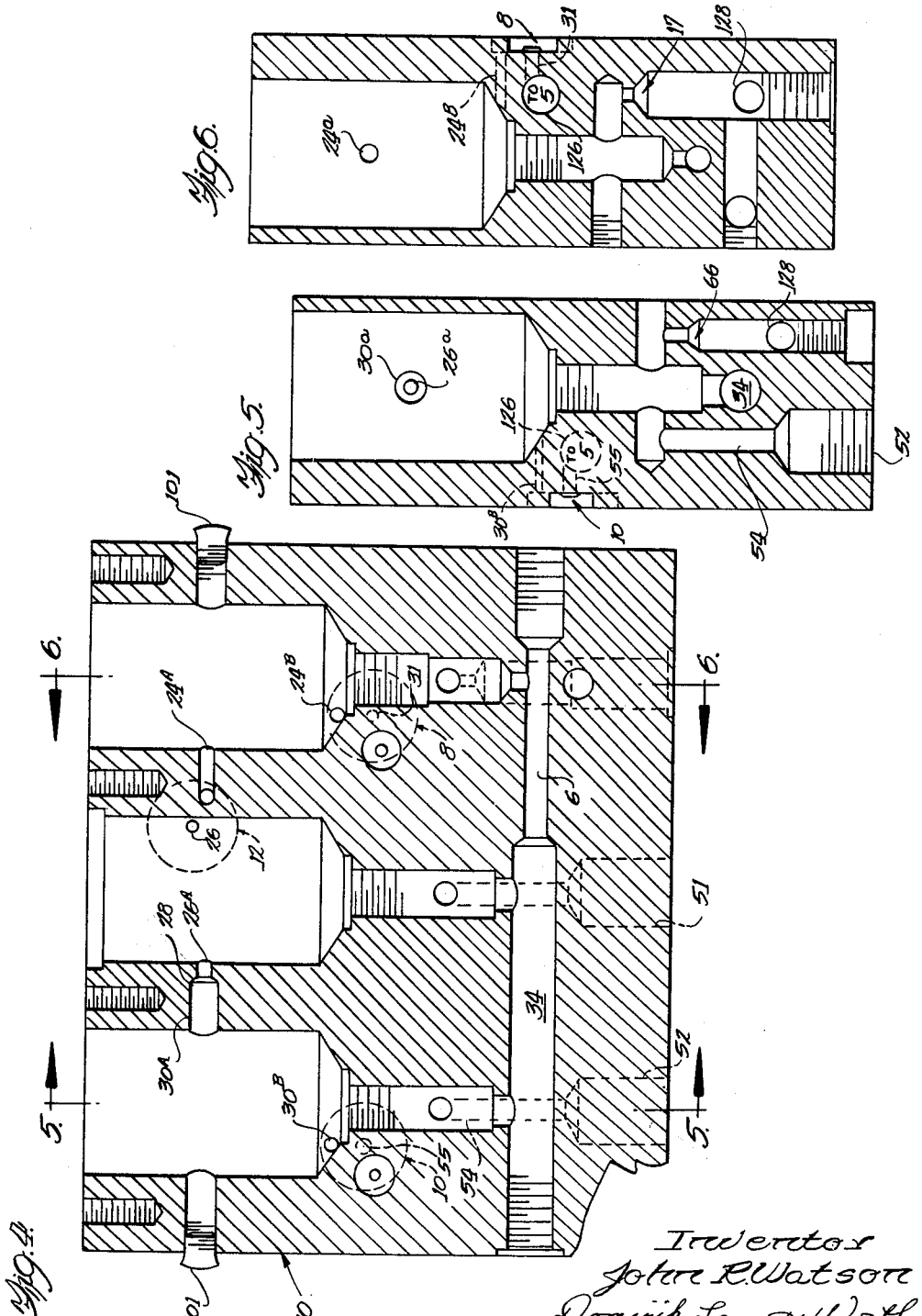

Inventor
John R. Watson
Dominik, Lazo & Worth
Attorneys 3,178,886
METHOD AND APPARATUS FOR CONTROL
OF FLUID SYSTEMS
John R. Watson, Omaha, Nebr., assignor to
Applied Power Industries, Inc.
Filed Nov. 22, 1961, Ser. No. 154,314
15 Claims. (Cl. 60—52)

This invention relates to the method and the apparatus for controlling a fluid system. The invention has special reference to a method and apparatus for control of a hydraulic system having a reversible motor therein. One aspect of the invention is especially advantageous for use in the control of a double acting cylinder wherein full pressure is exerted against the piston on both the extension and the return strokes. Another aspect of the invention relates to a valve construction readily adaptable to either three way or four way valve operation to control the operation of either single acting or double acting hydraulic cylinders during extension and return strokes and for holding the cylinder (or its associated piston) in position. This is a continuation-in-part of my copending application Serial No. 22,271, filed April 14, 1960, now Patent No. 3,113,432, issued December 10, 1963 for "Method and Apparatus for Controlling High Pressure Fluid by Low Pressure Blocking."

A feature of the invention is a valve means providing a pair of positive acting fluid blocking valves interconnected by a yieldable means and having a conduit (ordinarily connected to one side of the motor) connected intermediate the valves. One valve is connected by conduit to a chamber in which is disposed a means for operating said valve responsive to the movement of a movable member in the chamber. To such end, an actuating means transfers the movable member motion to one of the valves, and the yieldable means just yields and then transfers such motion to the other valve.

Another feature of the invention is the employment of a pilot system arranged to apply pilot pressures to open and close high pressure valves which in turn direct hydraulic liquid to one side of the reversible hydraulic motor while exhausting hydraulic fluid from the other side of the motor. The exhaust system, in the preferred embodiment, returns the liquid to a reservoir from whence it is pumped to the high pressure valves. Pressures in the exhaust system are employed as the pilot pressures. A related feature is use of the pilot valves to hold the motor (e.g., piston and cylinder).

A further feature is the use of a check type valve whereby high pressure fluid is controlled with a structure of maximum effectiveness and simplicity of construction.

Another feature of the invention is the employment of a normally open high pressure control valve between one side of the motor and exhaust which valve closes the path to exhaust responsive to downstream pressure rising to a predetermined level, and which maintains the path closed until the associated pilot valve reduces such downstream pressure.

A further feature is the provision of a normally closed high pressure control valve which opens the path to exhaust from the other side of the motor responsive to a pressure in a separate part of the exhaust system. The pilot valve establishes pressure communication between the separate exhaust system and the responsive part of the control valve.

A preferred embodiment of the invention provides an apparatus so constructed that ball-type valve elements and seats are employed for high pressure control valves and solenoid valves are employed for pilot valves. The ball-type valves and seats offer advantages in sealing tightly when arranged, as here, so that high pressure urges the element against the seat to produce a positive sealing or seating action. The arrangement is such that the solenoid valves are isolated from high pressures by the high pressure control valves thus requiring less power to operate the solenoids. This ball-type of valve element and seat is termed a positive fluid blocking valve.

Still another feature, in one specific embodiment is a valve body, essentially of one piece of material, which defines the various fluid passages, means for supporting valve elements and associated apparatus, and which supports the various solenoids.

One object of the invention is to provide a method and an apparatus for operating a reversible fluid motor with full pressure on its extension and return strokes.

Another object of the invention is to provide a method and an apparatus for operating a double acting piston and cylinder with full pressure on its extension and return strokes.

Another object of the invention is to provide the features, objects, and advantages previously set forth singly or in any combination one with another.

Other objects, advantages and features will become evident from the following description in conjunction with the annexed drawings wherein:

FIG. 1 schematically represents an apparatus embodying the invention.

FIG. 1A represents a modification of FIG. 1 to convert the system to single acting cylinder control, all other parts remaining the same.

FIG. 2 is a front elevation cross-section assembly view of an embodiment of the invention.

FIG. 3 is an end cross-section assembly along line 3—3 of the embodiment of FIG. 2.

FIG. 4 is a front elevation cross-section of the valve body, as viewed in FIG. 2, representing additional details with more clarity.

FIG. 5 is an end cross-section view along line 5—5 of FIG. 4.

FIG. 6 is an end cross-section view along line 6—6 of FIG. 4.

Throughout the drawings, the same reference number refers to the same element.

Figure 7:
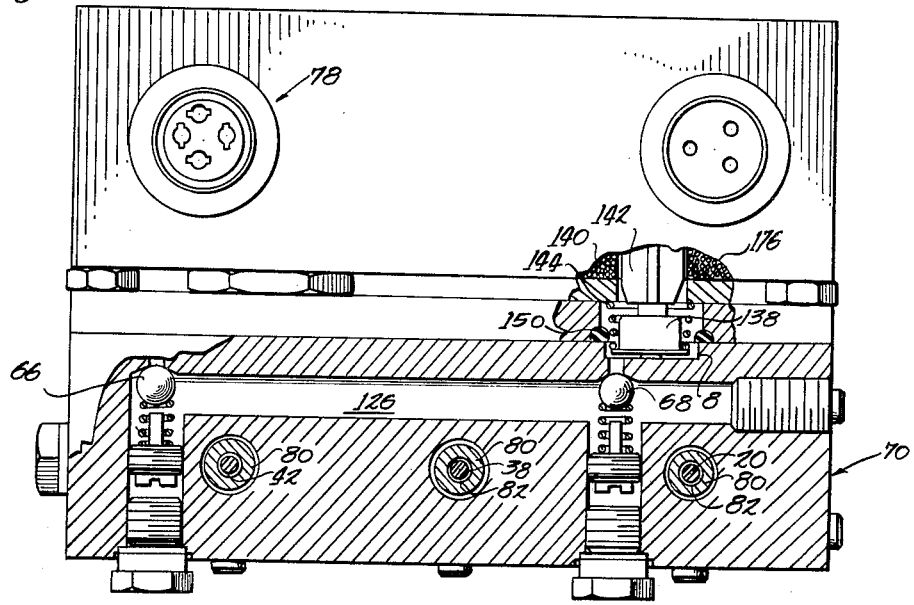
FIG. 7 is a plan cross-section assembly view along line 7—7 of FIG. 2 with a portion offset therefrom showing a solenoid valve and its seat.

For purposes of simplicity and explanation, certain pressures will be referred to below, it being understood that they are used by way of example and not by way of specific limitation. In this connection, the present system is particularly adapted for use with high pressures and contemplates hydraulic liquid being used at a pressure of 10,000 p.s.i. gauge for purposes of operating a hydraulic motor. Pilot pressures of about 270 p.s.i. gauge are derived from the high pressure hydraulic liquid and used to actuate various ones of the high pressure fluid control valves. Other hydraulic liquid pressures and valve settings will be described below.

At the outset it is to be realized that hydraulic systems of this nature contemplate employing a pump that runs continuously, delivering fluid under a pressure suitable for the work to be accomplished. The functions of the hydraulic systems are achieved by directing this fluid through particular conduits and if necessary adjusting its pressure while so directing. The pump is thus permitted to operate continuously while the various hydraulic circuit functions are carried out. In the present instance, the functions include operating a double acting cylinder with full hydraulic pressure on both the extension and retraction strokes.

In broad outline, the system to be described contemplates three variable volume control chambers or cavities 22, 37, 56 and their associated yieldably preloaded pistons 18, 36, 40. The first such variable volume chamber 22 serves as a by-pass. The next two variable volume units are oppositely yieldably loaded and operate in reverse order when advancing or retracting, and differ from the by-pass by including a spacer 39 and an upstream shut-off valve 48, 46 activated by the movement of their associated pistons 40, 36. The pilot or exhaust pressures downstream of the cavities 22, 58, 56 are controlled by simple low pressure solenoid valves 8, 12, 10. The sequence of control is as follows:

|  | Valve 10 | Valve 12 | Valve 8 |
| --- | --- | --- | --- |
| Neutral | Closed | Open | Open. |
| Advance | Open | Closed | Closed. |
| Retract | Closed | Open | Closed. |

The following more detailed description of operation will support the working out of the foregoing principles.

A description of the operation, referring to FIG. 1, will first be given in order to clarify the structure shown in the remaining figures. FIG. 1 shows three high pressure fluid positive blocking means, valves 16, 32 and 44. Means 16 and 44, each in conjunction with its associated piston and spring operator and a connection to the pilot conduit system extending between the pilot valves 8, 10, and 12, both respond to pressure at least equal to a predetermined downstream pressure (e.g. 270 p.s.i. pilot pressure) in the pilot conduit system 24, 26 and 30. The response to the pilot conduit pressure establishes a positive seal at the blocking means 16, 14 between the valve element thereof and the corresponding valve seat which stops flow (at pressures above 270 p.s.i.) in either direction through the blocking means. Moreover, the arrangement is such that the blocking means both coact with their respective pistons and cylinders to respond to pressures less than said predetermined downstream pressure by opening the passageway controlled thereby, thus establishing a path to exhaust. Hydraulic liquid is released or trapped in the exhaust or pilot system between the solenoid valves 8 and 10 and the respective blocking means 16 and 44. Closing valves 8, 10 lets pressure build up by stages in the system whereupon valves 16 and 44 close to trap liquid downstream of the latter. Opening valves 8 and 10 releases the pressure downstream of valves 16 and 44 whereby the latter open.

Blocking means 16 and 44 are normally open valves while high pressure blocking means 32 is a normally closed valve which opens a path to exhaust through conduit 60 responsive to a pressure in portion 26 of the pilot conduit, where such pressure is at least equal to a predetermined pressure. Such predetermined pressure is ordinarily established in pilot conduit portion 26 by opening the valve 12 and closing the valve 8. The blocking means 32 closes the path to exhause responsive to a pressure in portion 26 of the conduit, when such pressure falls below the last mentioned predetermined pressure (pilot pressure of 270 p.s.i.).

The valves 46 and 48 cooperate with valves 32 and 44 in such fashion as to control the direction of fluid into one end of the reversible motor (hydraulic cylinder 3) and to exhaust from the other end. Valves 46 and 48 constitute high pressure supply control valve means operating similarly to a check valve to open and pass fluid to the hydraulic cylinder in response to selectively opening the pilot valves, or closing the pilot valves as the case may be. Moreover, when the hydraulic cylinder is to hold at a particular position, no fluid is admitted to or exhausted from either end in which case all of the valve means 32, 48, 44 and 46 are closed. This is referred to as the neutral position during which time the pump continues to run and the valve 16 diverts fluid discharge from the pump through a bypass system ultimately back to the exhaust or reservoir via open solenoid valve 8.

The use of solenoid valves 8, 10 and 12 allows complete control of the entire system at a valve control station which is remote from the cylinder or other reversible motor. Also, appropriate setting of the pilot valves and connection of the cylinder permits operation of the entire valve system as a three-way valve to operate a single acting cylinder, as described with respect to FIG. 1A.

*Valve action in the neutral position*

In the neutral or hold position the piston 2 in the cylinder 3 is locked by fluid against movement in either direction. The hydraulic fluid moves from the pump 4 through the cylinder cavity 22 and is by-passed back to exhaust or the reservoir 5. In this neutral position, load can be maintained without movement.

Referring to the hydraulic circuit schematic of FIG. 1, the flow of fluid from the pump is in delivery conduit 6. In the neutral position solenoid valve 8 is open; solenoid valve 10 is closed; and solenoid valve 12 is open. The flow of fluid in line 6 is blocked at check valve 14 which requires 400 p.s.i. to open. The fluid is then diverted toward high pressure control poppet-type valve 16 and high pressure relief valve 17. Solenoid valve 8 is open to reservoir relieving the pilot pressure below piston 18. The force of spring 19 behind piston 18 urges piston 18 downward and the attached pin 20 opens valve 16. The fluid passes through valve 16 into cylinder cavity 22 and into line 24. Solenoid valve 12 is also open for free flow toward valve 8 so that line 26 and line 24 become common passages. Fluid flow in the passage 30 is stopped at check valve 28 due to pressure in line 30 as explained below with respect to retraction. Solenoid valves 12 and 8 are open so that the fluid flows back to reservoir via line 31.

The pressure in line 26 is not high enough during this operation to cause normally closed high pressure poppet-type control valve 32 to unseat.

*Valve action in the advance position*

In this operating phase of the valve, solenoid valve 8 is closed; solenoid valve 10 is open; and solenoid valve 12 is closed.

The fluid flow from the pump is again in line 6 toward valve 14 and blocked at valve 14. Solenoid valves 8 and 12 are closed, therefore blocking fluid flow out of line 24. Valve 16 is open by the spring force behind piston 18. With fluid flow restricted in all directions the pressure builds up to 270 p.s.i. (because of the larger effective area of the piston, this is the pressure that overcomes the force of spring 19 behind the piston) moving piston 18 up and closing valve 16. Pressure continues to build up and valve 14 opens at 400 p.s.i. allowing fluid to flow to line 34. Without pilot pressure behind piston 36, the spring 37 below piston 36 moves piston 36 and its pin 38 up and valve 32 is closed initially by the small spacer 39. Solenoid valve 10 is open allowing the force of spring 41 above piston 40 to push piston 40 and its pin 42 downward to open valve 44 and close valve 46. With the fluid blocked at valve 46, the fluid pressure continues to build up and opens valve 48 which applies more force on spacer 39 to close valve 32. The line 50 through connection 51 supplies pressure fluid to the cylinder 3 to advance the piston 2. The fluid from the second cylinder connection 52 moves into line 54 and since flow is blocked at valve 46, passes through valve 44, into cylinder cavity 56, on into line 30, is blocked at check valve 28, passes through open solenoid valve 10 and back to reservoir 5 via conduit 55.

To clarify the function of the four-way valve in the neutral position assume that as the piston advances in its cylinder it supports a load of 2000 pounds. The 2000 pound load on the piston builds up pressure on the fluid in the cylinder cavity at connection 51 and in line 50. Flow through line 50 to exhaust is blocked by valves 32 and 48 which are hydraulically closed and load is held on the piston until the valve is further actuated. In the neutral position solenoid valves 8 and 12 are open to exhaust or reservoir, therefore piston 36 remains up since exhaust pressure does not actuate the piston 36.

Valve action in retraction position

In this phase of the valve, solenoid valve 8 is closed; solenoid valve 10 is closed; and solenoid valve 12 is open.

The fluid flow from the pump is again in line 6, to valve 14 and blocked at valve 14. With no appreciable pressure in line 6, piston 18 is down and valve 16 is open. The fluid flows through valve 16 into piston cavity 22 and out in line 24 and is blocked by closed solenoid valve 8. The fluid is then diverted to solenoid valve 12 which is open and flows into line 26. The pressure is still low so that piston 36 is up and valve 32 is closed, but there is enough fluid flow to open valve 28 and the fluid flows on into line 30. Solenoid valve 10 is closed and diverts the fluid into piston cavity 56 under piston 40.

The force of spring 41 normally biases piston 40 and pin 42 down to open valve 44 and close valve 46. The fluid is blocked at valve 46 and the fluid therefore is in communication with the cylinder via line 54, through which latter it tends to flow. In the cylinder the fluid meets a restriction and starts to build pressure. As the pressure in cavity 56 increases to 270 p.s.i. (pilot pressure) piston 40 raises and valve 44 closes. Now there is pilot pressure in line 30 which is blocked at closed solenoid valve 10. Pilot pressure of approximately 270 p.s.i. has built in line 26 moving piston 36 down, opening valve 32 and closing valve 48. Pilot pressure continues to move through open solenoid valve 12 into line 24. In line 24 the fluid is still blocked by closed solenoid valve 8. The fluid is diverted and pilot pressure builds moving piston 18 up allowing valve 16 to close. Fluid flow from the pump is now blocked at valve 16 so the pressure continues to build to 400 p.s.i. until check valve 14 opens and the fluid moves into line 34. In line 34 the fluid flow is blocked at valve 48 which is closed by pilot pressure above piston 36. The fluid in line 34 then moves to valve 46 and opens valve 46 increasing the closing force on valve 44. The fluid blocked at valve 44 moves into line 54 and on to the second connection 52 to retract the piston into the cylinder.

The fluid in the cylinder cavity adjacent the first connection 51 moves into line 50, is blocked at closed valve 48, moves into cavity 58 and back to reservoir 5 via conduit 60.

Again to clarify the function of the four-way valve in the neutral position, assume as the cylinder is retracting it is pulling a load of 2000 pounds. The valve is then changed to the neutral position, as above, to hold load. In the neutral position closed solenoid valve 10 and valve 28 retains pilot pressure in cavity 56 and keeps piston 40 in the up position. Therefore the pressure built from the 2000 pound load in the cylinder cavity adjacent 52 and line 54 hydraulically closes valves 44 and 46 and blocks flow.

Three-way operation

To further aid versatility of the valve, it can be quickly converted from a four-way valve to a three-way valve assembly for use with a single acting cylinder 3a as in FIG. 1A by flicking a switch at the valve control station to leave solenoid 12 always open, *and* by blocking the connection 51 on the valve as with a pipe cap (not shown). The valve assembly 1 per FIG. 1A is ready to be used as a three-way to operate the single acting hydraulic cylinder 3a. 52 is now the only fluid outlet on the valve. FIGS. 1 and 1A show the three-way operation modification of the valve 1 connections 51, 52 to the single acting hydraulic cylinders, all else remaining the same as in FIG. 1.

Three-way valve operation in the neutral position

The operation of the three-way valve in the neutral position is identical to the operation of the four-way valve in the neutral position. The main function of the neutral position is still to by-pass fluid flow from the pump, through the valve, back to reservoir and at the same time maintain load on the cylinder.

Three way valve operation in its advance position

The operation of the three-way valve in the *advance* position is identical to the above operation of the four-way valve in the *retract* position.

Three way valve operation in its retraction position

In the retraction phase: solenoid valve 8 is open; solenoid valve 10 is open; and solenoid valve 12 is open.

Solenoid valve 8 is open so that flow of fluid from the pump in 6 is blocked at valve 14 and diverted to valve 16 which is open due to the spring force pushing down piston 18. The fluid moves through valve 16 into line 24 out open solenoid valve 12 and back to reservoir via line 31. With solenoid valve 10 open, the spring force behind piston 40 opens valve 44 and closes valve 46. We now have an open line from connection 52 on the cylinder and back through line 54. Hence, the fluid passes through open valve 44, and through chamber 56 into line 30, out through open solenoid valve 10 and via line 55 back to reservoir. Thus the cylinder piston retracts either by its self contained spring or is driven back by the load. Also solenoid valve 12 is open, therefore opening line 26 into line 24 and back to reservior via open solenoid valve 8 and line 31. Since valve 46 is closed; valve 32 is closed, there is no fluid pumping action in lines 50 or 54.

High pressure safety valves 62, 64 are connected to unload respective ends of the cylinders via conduits 54, 50 respectively. High pressure safety valves 62, 64 are connected to exhaust and are adjusted to unload at a pressure above operating range, a pressure here of about 12,000 p.s.i. gauge. A high pressure safety valve 17 is set to unload the pump discharge system between the valves 14 and 16 at a pressure of 10,000 p.s.i. (designed operating limit) and is connected to return the hydraulic fluid to the reservoir 5. Low pressure safety valves 66 and 68 are set to unload at 300 pounds per square inch (above the 270 p.s.i. pilot pressure). Safety valves 66 and 68, respectively, unload conduits 30 and 24 and the associated cavities 56, 22.

FIGS. 2-9 illustrate a preferred embodiment of the pilot controlled four-way valve with full pressure return as described with respect to the schematic drawings, FIGS. 1 and 1A. Generally speaking, the embodiment comprehends a body member 70 in which are formed the various conduits for hydraulic fluid flow and the respective cylinders in which pistons are mounted. Additionally, the body member supports the solenoid valves 8, 10 and 12. A cap plate 72 is secured to the body by a plurality of bolts 74 in such fashion as to retain the various pistons and associated components in their respective cylinders. A smooth appearance is obtained by enclosing the solenoids 8, 10 and 12 in a housing which supports the electrical connections 78 that in turn can be connected to a source of electrical power.

Except for the solenoid valve construction (FIG. 7), the respective check valves, control valves, and safety valves are of a poppet-type that includes a ball urged against its seat by a spring or other resilient means (e.g., FIGS. 2, 3 and 7), generally speaking. The high pressure exhaust control means, valves 16, 32 and 44 are of this construction. What has been heretofore referred to as the valves is in fact the valve element.

The valve seat engaged by valve elements 16, 32 and 44 is provided at the lower end of a bushing 80 which threadedly engages the body member 70 at the bottom of the respective cavities 22, 58 and 56 (only one bushing being described, it being understood that the remainder are constructed in like fashion). The respective valve actuating means or rods, 20, 38 and 42 extend from their corresponding pistons through the hole 82 in the corresponding valve element, as seen in FIG. 2. The high pressure chambers defined between the valve seat on 80 and seat 92 (or 48) contains the positive blocking valves 44, 92 and 32, 94.

As the ball approaches its seat there occurs a throttling action to reduce the pressure of liquid flowing therethrough, whereby a high pressure is maintained on the upstream side of the bushing 80 and a low pressure is maintained in the cavity on the downstream side of the bushing. In this fashion high pressure is used to coact with the positioning springs 39, 84 and 86 to force the valve elements against their respective seats.

The positioning springs 39 and 86 and plungers 88, 90 constitute initially yieldable means allowing unseating of valves 32, 44 before establishing a positive or force transmitting link to valves 46, 48. Springs 39 and 86 are seated at their bottom ends (FIG. 2) on plungers 88 and 90 which respectively are urged by the springs against ball valve elements 46 and 48. The plungers are each shorter than the spring extended when the corresponding valves are seated and are preferably circular in cross section with a T shape along their axis. Valve seats 92 and 94 are preferably formed integrally with the body member 70 and receive their corresponding ball valve elements 46, 48. The supply conduit 34 communicates with the upstream side of the valve seats 92 and 94.

When the piston (or actuator movable member) moves, the actuating means (or rod) responds and transfers motion to the corresponding valve 32 or 44. The spring 39 (86) initially yields allowing valve 32 (44) to open. The high pressure valve 48 (46) is positively engaged and driven against its seat during the opening of valve 32 (44) when the spring compresses to the same length as the plunger, thus establishing a positive connection between the two balls 32, 48 (44, 46). During opening of the valve 32 (44) the respective initially yieldable means 39, 88 (86, 90) thus interconnects the two valves 32, 48 (44, 46) first yieldably until the plunger is engaged at each end by one of the valves and thereafter effects the connection positively responsive to the position to which it is driven by piston 36 (40). The positive connection occurs when the plunger is engaged at each end by a valve and continues while valve 32 (44) is held open. The reverse action occurs upon closure of valve 32 (44), wherein the positive connection is released, a yielding-apart action takes place to seat both valves and, if the high pressure blocking valve 48 (46) is to be opened, by the opening of the valve 48 (46) against the yieldable spring first and then establishing the positive connection.

The variable chamber actuator alluded to comprises the assembly of the cylinder or chamber containing a movable member such as the piston 36 (40). The movable member may also comprise a bellows or diaphragm. The actuator further includes a biasing means such as the spring 37 (41).

The cap plate 72 is threadedly engaged by an adjusting screw 96 which constitutes the means for adjusting the spring force of spring 41. A button 98 provides a means for seating the upper end of the spring on one side and for engaging the adjusting screw 96 on the other side. A pair of lock nuts 98, 99 are provided to secure the adjusting screw in place once an adjustment has been made. A similar construction generically denoted as 100, is used for adjusting the spring force of spring 19.

The pilot and exhaust pressure conduits 24, 26 and 30 of FIG. 1 are provided in a unique fashion by drilling communicating holes in the body between the cylinders in which the respective pistons 18, 36 and 40 are retained and by providing grooves in the pistons so that hydraulic fluid can flow through the pilot system. Plugs 101 (FIG. 4 only—omitted from FIG. 2 for clarity) seal the ends of the drilled passage. As best seen in FIG. 2, grooves 102, 104 and 106 are machined in the cylindrical faces of the respective pistons 18, 36 and 40. Hydraulic fluid which is to be exhausted from the cavity 22 will leave through that portion of conduit 24 designated as 24B. Pilot pressure fluid traveling in conduit 24 flows under pressure past the annulus 108 existing between the lower end of piston 18 and the adjoining cylinder wall, then through the larger annulus defined between the cylinder wall and groove 102. The pilot pressure fluid then travels to the solenoid valve 12 by exiting from the annulus of 102 through that portion of conduit 24 designated 24A (see FIGS. 1, 2, and 4). When solenoid valve 12 is open, the pilot fluid then flows through conduit 26 (FIGS. 1 and 4) into the annulus between groove 104 on the piston 36 and the corresponding cylinder wall. As seen in FIG. 2, a hole 26B is drilled in the wall of the piston 36 to communicate between groove 104 and the pilot pressure cavity 110 formed in the top of piston 36, thereby serving to establish pilot pressure on top of the piston 36.

It is thus seen that the body 70 defines a plurality of large chambers, each of which has a piston therein, and each of which chambers is connected to one of conduits 6 or 34 by a small chamber. The small chambers are in each instance separated from the cavity portion of the large chamber by a valve and valve seat. The small chambers connected to conduit 34 for the motor supply systems, also have a valve and valve seat between themselves and the conduit 34 and also have respective motor connection conduits 50, 54 connected from between the valve seats to the motor.

As best seen in FIG. 4, a hole is drilled between the cylinders containing pistons 36 and 40 in order to place the respective grooves 104 and 106 in communication. The check valve 28 is disposed in this hole, which has an enlarged portion 30A in which the check valve 28 is mounted. The check valve 28 conveniently comprises 2 spheres, 112 and 114, which are urged apart by a helical spring 116 disposed in compression between them. Sphere 112 constitutes the ball valve element which engages the valve seat which is formed where the hole diameter is decreased to form the passage designated 26A in FIG. 4.

Passage 30B leads from the bottom of cavity 56 back to the seat of solenoid 10, through which hydraulic fluid moves to exhaust (FIGS. 1, 4 and 5). Pilot pressure fluid leaks between the piston 40 and its mating cylinder wall at the point 118.

The respective pins 20, 38 and 42 are preferably secured to the underside of their corresponding pistons as by being formed integrally therewith.

O rings are employed to establish a sealed connection between the respective pistons and the adjoining cylinder walls. The O rings are positioned to promote the leakage past the pistons as described above. To this end, O rings 120 and 122 are positioned in appropriate grooves on pistons 18 and 40, at the top of the respective grooves 102, 106. The O ring 124 is positioned in the groove on piston 36 at a point between the cavity 58 and the groove 104 to avoid leakage between the latter two elements.

A hole 126 (FIGS. 3, 5 and 6) is drilled longitudinally of the body 70 in such fashion as to connect the various exhaust lines 55, 60 and 31 with the reservoir 5. A common line to the reservoir from the various safety valves is formed in a similar fashion by drilling the hole 128 longitudinally of the block to there connect the safety valves 17, 66 and 64. Both holes 126 and 128 are provided with female threads where they emerge from the side of the block, whereby appropriate piping is connected between them and the reservoir 5, pursuant to FIG. 1.

FIG. 3 shows a typical safety valve assembly which includes the ball valve element 64 urged against its seat by a resilient spring 138. The spring force is adjusted by adjusting screw 132. A similar construction may be used for the low pressure safety valves 66, 68 as shown in FIG. 7. The low pressure safety valves 66, 68 are connected to exhaust by a common conduit 126 which has a threaded connection at one end whereby tubing, pipe hose or the like may be connected to reservoir from the valve body.

Figure 8:
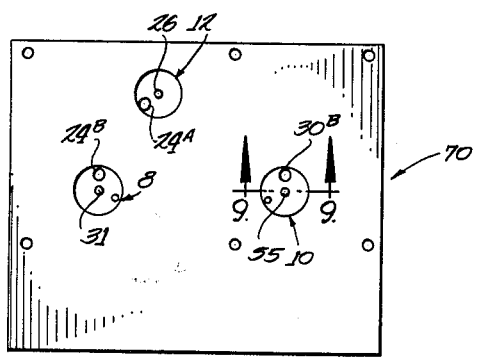
FIG. 8 is a rear elevation view representing solenoid valve seat arrangements on the rear of the body.
Figure 9:
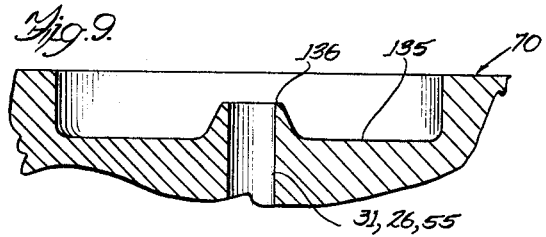
FIG. 9 is a partial plan view of a typical solenoid valve seat.

The seats for valves 8, 10 and 12 have been designated by those numbers in FIGS. 4–8 as a matter of convenience in identifying the element. The valve seats are formed in the back of the body 70, being arranged as shown in FIG. 8 and having a specific construction as represented in FIG. 9, where a depressed portion 135 is machined in the body. Passages such as 24A, 24B and 30B are drilled through the body to emerge in the portion 135. A raised central portion provides a valve seat 136 having a passage existing therefrom which may be either one of 31, 26 or 55. A valve element 138 (FIG. 7) moves in and out of sealing relation with the valve seat 136 when the coil 140 is electrically energized, or de-energized, thereby to attract or release the armature 142 which is connected to the valve element. A spring 144 urges the valve element 138 down against its seat. Sealing against leakage is promoted by the fact that low pressure is underneath the valve element and that pilot pressure is on top urging the element against the seat. Inherent in this valve construction is the ability to free flow responsive to a pressure differential in one direction only. Therefore, valve 12 is a free flow valve in the direction from pilot pressure in conduit 26 to exhaust pressure in conduit 24A. A solenoid mounting plate carries a plurality of properly positioned solenoid bushings which, in conjunction with the O ring 150 and the housing 152 of the coil serves to establish a sealed connection against leakage of hydraulic fluid.

Referring for a moment to FIGS. 3 and 5, connections 51 and 52 are shown as a threaded portion at the end of passages 50 and 54, whereby flexible tubing, parts or the like can be connected between the threaded parts 51, 52 and appropriate ends of the hydraulic motor such as the double acting cylinder assembly 2, 3.

In review, it will be seen that a system has been provided that allows for operation of a double acting cylinder in either direction with full pressure being applied both during extension and retraction of the piston. Moreover, a control system is provided that allows for holding the piston at a predetermined position. This is accomplished by utilizing pilot pressures. Furthermore, the extension, contraction and holding actions are all accomplished while the pump continues to run and while fluid is being delivered either to the cylinder (or other loader) or is being bypassed to exhaust. The system allows for changing the operation from movement of the piston in either direction to holding or to moving it in the opposite direction, or to any such combination while the pump continues to deliver fluid. This is achieved by a unique valving action which allows channelling the fluid from the appropriate end of the cylinder or trapping the fluid so that the piston cannot move in the cylinder.

Speaking with reference to extending or retracting a cylinder (or operating a reversible motor), the system has a feature allowing a unique type of pressure build-up whereby certain selected valves close in sequence while other valves open each at selected stages of the build-up in order to direct the fluid either to one side of the cylinder or to exhaust, as the case may be. This is accomplished by reason of the valve elements such as the piston actuated elements 16, 32 and 44 being responsive to pilot pressures. This is termed a "stage" blocking or unblocking action. The valves are selected indirectly by opening and/or closing selected ones of the pilot valves.

The discussion above has referred to valve 12 as being open in the neutral or holding position. In practice, valve 12 can be either open or closed, the choice being dictated by the specific application. For example, on applications where a high flow of hydraulic fluid is involved it has been advantageous to close valve 12 in neutral to eliminate the problem of the piston drifting under light load, the drifting occurring due to a tendency for ball 32 to move off its seat responsive to the pressure restriction through valve 8. On the other hand, low flow applications would generally dictate opening valve 12.

The check valve 14 aids in the pressure building, or staging, operation. However, the invention contemplates eliminating the valve 14 where, for example, a check valve action for stage blocking is provided by increasing the compressive force exerted by springs 39, 86 to promote the seating of the valves 46, 48.

Although described with reference to the embodiment of FIG. 1, it is to be understood that the conduits 50 and 54 could be reversed to connect to ports 51, 52 respectively. Similarly, the embodiment of FIG. 1A could be operated from fluid supplied via conduit 51.

Another feature of the system is the use of poppet-type valves which enables using extremely high hydraulic pressures, on the order of 10,000 pounds per square inch as has been used in the example above. This is accomplished by a simple construction with an irreducible minimum of leak proofing. However, pilot pressures of low magnitude are derived from the high pressure fluid and are employed in such fashion that the solenoid valves used as pilot control elements do not need powerful coils or other extremely powerful actuating means. Low pressure solenoid valve elements are suitable because of the low pressures existing in the exhaust and pilot systems.

A further feature of the invention is in a valve means having disposed in a valve chamber a pair of positive blocking valves such as 32 (44) and 48 (46) which are connected by an initially yieldable means for connecting such as the spring 39 (86) and plunger 88 (90). An outlet conduit 82 is connected downstream of the valve 32 (44) and leads to exhaust via the variable chamber actuator which includes the movable piston 36 (40) and a biasing means 37 (41). Another conduit 50 (54) connects with the valve chamber intermediate the valves therein. The movable member or piston is connected by an actuating means such as rod 38 (42) to the valve 32 (44) whereby the latter is positioned responsive to action of the movable member in the actuator.

Although particular embodiments of the invention have been shown and described in full here, there is no intention thereby to limit the invention to the details of such embodiments. The intention is to cover all modifications, alternatives, embodiments, usages and equivalents of the method and apparatus for control of fluid systems as fall with the spirit and scope of the invention, specification and the appended claims.

The invention claimed is:

1. A fluid handling system for controlling the operation of a fluid motor driven by fluid received through such system from a pressure source and comprising, in combination, delivery conduit means to receive fluid from said pressure source;

a holding exhaust system for selectively diverting fluid from said delivery line to exhaust, and including a holding exhaust conduit connected between said delivery means and exhaust;

a high pressure blocking means disposed in said holding exhaust conduit for responding to pressure at least equal to a predetermined pressure in said holding exhaust conduit downstream of said high pressure blocking means by establishing a positive seal to stop flow in either direction through said high pressure blocking means and for responding to a pressure downstream of said high pressure blocking means that is less than said predetermined pressure by allowing flow therethrough;

a low pressure blocking pilot means disposed in said holding exhaust conduit for selectively opening and closing the path to exhaust downstream of said high pressure blocking means;

first conduit means for exhausting low pressure fluid and for receiving high pressure fluid;

second conduit means for exhausting low pressure fluid and for receiving high pressure fluid;

first and second supply means for controlling the supply of high pressure fluid directed into said first and second conduit means, respectively;

first and second exhaust means, each for respectively directing low pressure fluid through a pressure-reducing path to exhaust from said first and second conduit means;

first pilot means for selectively diverting low pressure fluid from between said high pressure and low pressure blocking means to said first exhaust means;

second pilot means for selectively establishing or blocking a flow path to exhaust from said second exhaust means;

exhaust check valve means for establishing flow from from said first pilot means to said second exhaust means and for opposing flow in the opposite direction; and a conduit means for connecting said first and second supply means to said delivery means;

said first exhaust means directing low pressure fluid to exhaust in response to selective diversion of fluid by said first pilot means while said exhaust check valve means blocks flow to said second pilot means.

2. A system in accordance with claim 1 wherein said high pressure blocking means includes a valve body provided with an interior structure defining a large diameter chamber with a small diameter chamber extending coaxially from a first end thereof and an exhaust port adjacent said first end, a valve seat in said small chamber adjacent said large chamber first end, a ball valve sealingly engageable with said valve seat and reciprocatable in said small chamber;

a piston slidably disposed in said large chamber;

a spring in said large chamber for resiliently urging said piston toward said first end;

and a rod extending between said piston and ball through said valve seat;

and wherein said low pressure backing means includes a solenoid valve;

said holding exhaust conduit including the passage defined through said small chamber past said valve seat, past said exhaust port and past said solenoid valve.

3. A fluid handling system for controlling operation of a fluid motor comprising, in combination, delivery conduit means connected to receive fluid from a pressure source;

a holding exhaust means for selectively diverting fluid from said delivery line to exhaust;

a first conduit means for exhausting low pressure fluid and for receiving high pressure fluid;

a second conduit means for exhausting low pressure fluid and for receiving high pressure fluid;

a pilot operated exhaust and supply system connected to said first condit means and including— a first exhaust conduit connected between said first conduit means and exhaust, a first supply conduit connected between said first conduit means and said delivery conduit, a pilot pressure conduit connected to said holding exhaust means, pilot means in said pilot pressure conduit for selectively blocking or unblocking said pilot pressure conduit, exhaust blocking means for establishing communication to said exhaust conduit from said first conduit means responsive to a predetermined pressure in said pilot pressure conduit when said pilot means unblocks said pilot pressure conduit, and supply control means for blocking said first supply conduit responsive to said exhaust blocking means establishing communication to exhaust, and for establishing communication between said first connection and said supply conduit responsive to the absence of the last said communication to exhaust and to a predetermined high pressure in said delivery conduit;

supply means for supplying high pressure fluid to said second conduit means;

exhaust means for directing low pressure fluid to exhaust from said second conduit means;

second pilot means for selectively establishing or blocking a flow path to exhaust from said second exhaust means;

exhaust check valve means for establishing flow from the first-said pilot means to said exhaust means and for opposing flow in the opposite direction; and a supply check valve means for connecting said first supply conduit and said supply means to said delivery means, for opposing flow from either of said supply conduit and said supply means to said delivery line, and for establishing communication between said supply conduit and said supply means and said delivery line in response to a predetermined intermediate fluid pressure; whereby said first exhaust means directs low pressure fluid to exhaust in response to selective application of fluid pressure to said exhaust blocking means by said first pilot means when said second pilot means is selectively blocking flow to exhaust from said second exhaust means.

4. A system in accordance with claim 3 wherein said exhaust and supply system further includes a valve body provided with an interior structure defining a large diameter chamber with a small diameter chamber extending coaxially from a first end thereof a first and a second valve seat respectively disposed coaxially at an end of said small chamber to face inwardly of said chamber, said first valve seat being adjacent to said large chamber first end, a first ball valve in said small chamber sealingly engageable with said first valve seat, a second ball valve in said small chamber sealingly engageable with said second valve seat, said first conduit means being connected to said small chamber intermediate said valves, a spring urging apart said first and second valves, a rod extending part but not all of the distance between said valves, a piston in said large chamber, a second spring biasing said piston away from said large chamber first end, and a second rod extending between said piston and said first valve through said valve seat, said valve body also defining an exhaust port adjacent said large chamber first end in open communication with a first face of said piston and a pilot pressure port for communicating with the other face of said piston, said first exhaust conduit including the flow path defined from between said first and second valves, past said first valve through said large chamber end to said exhaust port, said first supply conduit including the passage defined past said second valve, said pilot pressure conduit being connected to said pilot pressure port, said exhaust blocking means including said piston, second rod, first valve and first seat, and said supply control means including said second seat and said second valve.

5. A pilot-controlled valve system for controlling high pressure hydraulic fluids in operating a reversible motor, said system comprising—
- first conduit means for defining a supply and delivery conduit;
- a pilot conduit connected to exhaust at each end thereof;
- first, second and third pilot valves disposed in said pilot conduit;
- a check valve disposed in said pilot conduit to prevent flow from said third valve to said second valve;
- a holding exhaust conduit connected at one end to said pilot conduit between said first and second pilot valves and connected at the other end to said first conduit means upstream of said first check valve;
- a second conduit means for connecting at one end to said pilot conduit between said third pilot valve and at the other end to said supply conduit downstream of said first check valve;
- a first motor supply- and-exhaust conduit connected at one end intermediate the ends of said second conduit means and for connection at the other end to one side of a hydraulic motor;
- a second motor supply and exhaust conduit for connection to the other side of a hydraulic motor;
- first and second high pressure blocking means disposed respectively in said holding exhaust conduit and in said second conduit means between said pilot conduit and said first motor supply conduit connection;
- each of said blocking means for responding to an actuating pressure in said pilot conduit that is at least equal to a predetermined pressure by establishing a positive seal to stop flow in either direction through said blocking means;
- a normally closed high pressure blocking means for opening a path to exhaust from said second supply and exhaust conduit in response to a pressure in said pilot conduit that is at least equal to a predetermined pressure and for closing such path to exhaust responsive to a pressure in said pilot conduit less than such predetermined pressure;
- third conduit means for communicating pressure to said normally closed high pressure blocking means from said pilot conduit between said second check valve and said second pilot valve;
- fourth conduit means for connecting said second motor supply and exhaust conduit to said first conduit means downstream of said first check valve;
- a first high pressure supply valve means in said fourth conduit means; and
- a second high pressure supply valve means in said second conduit means between said first motor supply and exhaust conduit and said first conduit means;
- each of said first and second high pressure supply valve means for opening and closing respectively responsive to said second and normally closed blocking means closing and opening respectively when said first pilot valve is closed and when said third pilot valve is respectively opened or closed and said second pilot valve is respectively closed or opened.

6. A packaged valve assembly unit for achieving flow control comprising in combination
- a generally rectangular body with first and second sides and first and second ends defining the edges of the front and back of said body;
- respective first, second and third large diameter passages extending from said first side partially toward said second side;
- means for sealing said first side over said first, second and third large passages;
- said body having therein—
- an inlet passageway extending generally parallel to and adjacent said second side from said first end;
- respective first, second and third small diameter passages extending respectively from said inlet passage to said first, second and third large passages;
- a first check valve disposed in said inlet passage and oriented to prevent flow in the direction from said first to said second small diameter passages;
- a valve seat fixed in each of said small diameter passages adjacent the corresponding large diameter passage;
- a movable ball valve mounted for reciprocation in each of said small diameter passages to engage or disengage its respective seat;
- pistons sealingly engaging the walls of, and mounted for movement in, each of said large diameter passages, thereby defining first, second and third chambers in each of said first, second and third large diameter passages, respectively;
- first and second springs respectively mounted between said sealing means and the pistons in each of said first and third large diameter passages to bias each said piston toward its corresponding small passage;
- a third spring mounted in said second large diameter passage to bias the corresponding piston away from said ball valve;
- each of said valve seats being disposed between the respective corresponding ball valve and piston;
- rods extending from each of said pistons into engagement with the corresponding one of said balls whereby each of the first-said springs normally biases the corresponding ball off its respective seat via said rod and whereby said third spring normally biases its respective rod and piston out of engagement with the ball;
- outlet passages leading out of each of said first, second and third chambers from the region between the piston and the ball valve of each;
- another passage communicating with said second chamber, the piston separating said second chamber outlet therefrom;
- second balls in each of said second and third small diameter passages;
- second rods in each of the second and third small diameter passages separating the first-said balls from the second said balls;
- valve seats in each of said second and third small diameter passages at the end adjacent said inlet passage; and
- outlet lines from each of said second and third small diameter passages from a region between the balls therein.

7. A fluid handling system for controlling the operation of a fluid motor, comprising, in combination
- delivery conduit means for connection to a source of fluid;
- a holding exhaust means for selectively diverting fluid from said delivery line to exhaust;
- a first conduit means for exhausting low pressure fluid and for receiving high pressure fluid;
- a second conduit means for exhausting low pressure fluid and for receiving high pressure fluid;
- a supply means for supplying high pressure fluid to said first conduit means;
- an exhaust means for directing low pressure fluid to exhaust from said first conduit means;
- first pilot means for selectively diverting fluid from said holding exhaust system to said exhaust means;
- a pilot operable supply and exhaust system connected to said second conduit means that includes
- an exhaust conduit connected between said second conduit means and exhaust,
- a high pressure blocking means disposed in said exhaust conduit for responding to pressure at least equal to a predetermined pressure in said exhaust conduit downstream of said high pressure blocking means by establishing a positive seal to stop flow in either direction through said high pressure blocking means and for responding to a pressure downstream of said high pressure blocking means that is less than said predetermined pressure by allowing flow therethrough, a low pressure blocking pilot means disposed in said exhaust conduit downstream of said high pressure blocking means for selectively opening and closing the path to exhaust downstream of said high pressure blocking means, a supply conduit connected between said second conduit means and said delivery conduit, and supply control means for blocking said supply conduit in response to said blocking pilot means opening the path to exhaust and for establishing communication between said second connection and said supply conduit in response to closing the path to exhaust downstream of said high pressure blocking means and to a predetermined high pressure in said delivery conduit, and exhaust check valve means for establishing flow from the first-said pilot means to said exhaust conduit and for opposing flow in the opposite direction; and a supply check valve means for connecting said supply means and supply conduit to said delivery means for opposing flow from either of said supply conduit and said supply means to said delivery means, and for establishing communication between said delivery means and said supply means and supply line in response to a predetermined fluid pressure.

8. A system in accordance with claim 7 wherein said exhaust and supply system further includes a valve body provided with an interior structure defining a large diameter chamber with a small diameter chamber extending coaxially from a first end thereof, an exhaust port adjacent said large chamber first end, first and second valve seats respectively disposed coaxially at an end of said small chamber to face inwardly of said chamber, said first valve seat being adjacent said large chamber first end, a first ball valve in said small chamber sealingly engageable with said first valve seat, a second ball valve in said small chamber sealingly engageable with said second valve seat, both said ball valves being reciprocatable in said small chamber, said second conduit means being connected to said small chamber intermediate said valves, a spring urging apart said first and second valves, a rod extending part but not all of the distance between said valves, a piston slidably mounted in said large chamber, a second spring biasing said piston toward said large chamber first end, and a second rod extending between said piston and said first valve through said valve seat, said supply control means including said second valve and said second valve seat, said high pressure blocking means comprising said first valve and said first valve seat, and said exhaust conduit including the flow passage defined from intermediate said valve past said first valve seat through said first end of said large chamber to said blocking pilot means.

9. A valve system comprising in combination
a valve body defining a first large diameter chamber with a first small diameter chamber extending coaxially from a first end thereof,
an exhaust port adjacent said first end,
and a pilot port adjacent the other end of said large diameter chamber,
and a second large diameter chamber with a second small diameter chamber extending coaxially from a first end and an exhaust port adjacent said first end,
each small diameter chamber having therein a first valve seat adjacent said large diameter first end and a second valve seat at the opposite end of said small chamber, both valve seats arranged to face inwardly of said small chamber and disposed coaxially, a first ball valve in said first small chamber sealingly engageable with said first valve seat, a second ball valve in said first small chamber sealingly engageable with said second valve seat, a third ball valve in said second small chamber sealingly engageable with the first valve seat therein, a fourth ball valve in said second small chamber sealingly engageable with said second valve seat thereof, a rod extending coaxially of each of said small chambers between the respective valves therein, resilient means for urging apart the valves in said first small chamber, second resilient means for urging apart the valves in said second small chamber, a piston sealingly disposed in each large chamber between the two ends thereof, a rod extending between said piston and the small diameter valve adjacent the corresponding chamber first end, resilient means in said first large chamber urging the piston away from said first end, resilient means in said second chamber urging said piston towards the first end thereof, said body also further defining
a supply conduit connected to said second valve seat in each of said small chambers, a first exhaust conduit extending from said first large chamber exhaust port, a second exhaust conduit extending from said second large chamber exhaust port, a pilot conduit establishing communication between said second exhaust conduit and said first pilot port, and a conduit extending from each small chamber intermediate the two valves therein;

and a check valve disposed in said pilot conduit to oppose flow from said second exhaust conduit to said first pilot port;

a first pilot valve connected between said pilot conduit and a pressure source;

and a second pilot valve connected in said second exhaust conduit.

10. A valve body having walls and passages defining:
first, second and third large diameter chambers arranged on parallel axes to extend partially through said body;

a supply-and-delivery passage extending at least partly through said body transversely to said first, second and third large diameter chambers;

first, second and third small diameter chambers extending respectively coaxially from said first, second and third large diameter chambers to said supply-and-delivery passage;

an exhaust passage extending at least partly through said body parallel to said supply-and-delivery passage;

a first valve seat on the outside of said body having a valve element engaging portion;

a first passage extending from said first large diameter chamber adjacent said first small diameter chamber to said first valve seat;

a second passage extending from said exhaust passage to said first valve seat element engaging portion;

a second valve seat on the outside of said body having a valve element engaging portion;

a third passage extending from intermediate said first large diameter chamber to said second valve seat;

a fourth passage extending from said second valve seat element engaging portion to intermediate said second large diameter chamber;

a fifth passage connecting the intermediate portions of said second and third large diameter chambers;

a third valve seat on the outside of said body having a valve element engaging portion;

a sixth passage extending from said third large diameter chamber adjacent said first small diameter chamber to said third valve seat; and a seventh passage extending from said exhaust passage to said third valve seat element engaging portion.

11. A double acting motor control system comprising, in combination, a pump, a double acting motor having a working and non-working side, a plurality of reducing valves, each said reducing valve having a variable chamber, at least two of said valves having a high pressure by-pass, a pilot pressure by-pass associated with and actuated by at least one such reducing valve, a plurality of selectively openable low pressure pilot vales, first conduit means connecting the pump to the motor through at least two high pressure by-passes, and second conduit means connecting the motor to the variable chamber reducing valves, exhaust conduit means connected to said variable chamber reducing means to receive pressure fluid from said second conduit means, and conduit means connecting the pilot valves to the reducing valve variable chambers whereby selectively controlling the pilot valves actuates the reducing valve and high pressure by-passes of said valves to deliver high pressure fluid selectively to either side of the double acting motor while simultaneously permitting exhaust at the non-working side of the motor.

12. A double acting motor control system comprising, in combination, a pump, a double acting motor having a working and non-working side, a plurality of reducing valves, each said reducing valve having a variable chamber, movable means operatively responsive to the variations in said variable chambers to operatively actuate various valve means, at least two of said reducing valves having high pressure bypass valve means actuated by said movable means, a pilot pressure bypass actuated by at least one such reducing valve movable means, a plurality of selectively openable pilot valves, first conduit means connecting the pump to the motor through the high pressure valve bypasses, and second conduit means connecting the motor to exhaust through the variable chambers of the reducing valves having the high pressure bypasses, and conduit means connecting the pilot valves to the variable chambers whereby selectively controlling the pilot valves selectively actuates one high pressure valve bypass to deliver high pressure fluid selectively to one side of the double acting motor while simultaneously permitting exhaust at the non-working side of the motor through the variable chamber of the second high pressure bypass valve variable chamber.

13. In a double acting motor control system of the character defined in claim 12, means oppositely yieldable varying the size of the variable chambers in the high pressure bypass variable chamber reducing valves.

14. Valve means comprising, in combination, a high pressure positive fluid blocking check-type first valve, a high pressure chamber downstream of said first valve, a fluid blocking second valve in said high pressure chamber, initially yieldable means interconnecting said first and second valves, first yieldably and then positively, a variable chamber actuator having a movable member therein, second valve positive actuating means extending from said movable member to unseat said second valve responsive to movable member movement, first conduit outlet means connected to said second valve and high pressure chamber, second conduit means from said high pressure chamber intermediate said first and second valves, whereby high pressure fluid admitted to said high pressure chamber by the first valve may be diverted through said second conduit means to do work, and exhaust pressure fluid may return through said second conduit into the high pressure chamber and be discharged through the first conduit means while the first valve blocks high pressure fluid from entering the high pressure chamber.

15. In a control valve for high pressure controls, a subcombination valve comprising, in combination, a variable volume chamber, a movable member in said variable volume chamber, an actuator operated by said movable member, yieldable means engaging said movable member, positive seal valve means actuated by said movable member, first yieldable and then positive connecting means actuated by said positive seal valve means, and a second positive seal valve means actuated by said first yieldable and then positive connecting means.

References Cited by the Examiner
UNITED STATES PATENTS 2,847,029   8/58   McRae _____ 137—621
2,980,135   4/61   Tennis _____ 137—621

EDGAR W. GEOGHEGAN, *Primary Examiner.*

JULIUS E. WEST, *Examiner.*